UNITED STATES PATENT OFFICE.

MORGAN W. BROWN, OF MORRISANIA, NEW YORK.

IMPROVEMENT IN COMPOSITIONS FOR ENAMEL, PAINT, &c.

Specification forming part of Letters Patent No. 49,708, dated September 5, 1865; antedated August 23, 1865.

*To all whom it may concern:*

Be it known that I, MORGAN W. BROWN, of Morrisania, in the county of Westchester, in the State of New York, have invented a new and Improved Mode or Process for the Manufacture of a Composition of Matter for an Enamel, Paint, Plaster, and Cement; and I do hereby declare that the following is a full and exact description thereof.

The nature of my invention for a new composition of matter for (and to be used as) a paint, enamel, cement, and plaster consists of an admixture of alkaline silicates with pulverized or finely-ground white marble. The Rutland, Vermont, statuary white marble I use for the best white colors, but also use any other native limestone, finely-ground, with a similar result. I mix with the marble-dust an alkaline silicate of any kind, but prefer the use of a silicate of soda and potash made strongly silicious. This forms the principal base of my composition of matter which I claim as my invention for a white paint, enamel, cement, and plaster. I use also into this composition other carbonates of lime in certain proportions—as ground shells, chalk, whiting, or Paris white—as may be required, in different proportions; but I prefer the use of marble or native limestone, unburned, as the base of my composition of matter, mixed with an alkaline silicate for the formation of a paint, enamel, cement, or plaster.

I also claim the use and application of the white oxide of zinc, and also the use of silicate of alumina (clay) into my composition of matter as an auxiliary substance, and for the purpose of increasing its durability, and to render its application as a paint for coating various substances more easy of application. All of these bodies, on being mixed, applied, and becoming hard on surfaces or other applications, by the aid of heat, become as hard as marble or stone in a very short period of time and at common temperatures — sufficiently hard in its application as a paint or plaster. As an enamel (or for the production of crockery-ware, porcelain buttons, and various other substances produced and manufactured from this composition of matter) I use the white finely-ground Rutland marble, mixed with an alkaline silicate, and, after this becomes dry and hard by exposure for a few hours to the atmosphere at common temperature, I submit the substance so coated or enameled, providing such substance is not affected by a heat of 150° to 200° Fahrenheit, or even at a lower degree. By this means it is more quickly rendered insoluble to water, and I find for the manufacture of all substances formed of the composition itself—as, for instance, buttons, crockery, artificial stone, marble ornaments, &c.—the application of the aforesaid heat of 150° to 200° is my mode of producing a more beneficial result than is otherwise accomplished at our common temperatures.

After the application of my composition of matter, either in the form of paints in coatings, or as an enamel, plaster, or cement, (placed on the substance or formed and fabricated in bodies,) I claim the use and application of one or more layers on the outside of an alkaline silicate in the fluid or semi-fluid form as varnish. I use for this purpose an alkaline silicate from 20° to 30° or 35° Baumé, the same as I use for the mixing of my composition of matter; but I prefer to use an alkaline silicate treated previously to being used with an oxide of the earths or metals, and use the oxide of zinc for the purpose, and in just such proportions as to cause or render the outside coating of varnish (such varnish being alkaline silicates treated with oxide of zinc) insoluble after its application and the same is thoroughly dry.

I claim the admixture of all other colors other than white into the marble-enamel (which is white) in the following manner. After the enamel is poured on and over the surfaces to be enameled, and while soft, and before it sets and becomes hard, I then drop on or pour on and mix any of the different colors, or any one color to be used on the surface containing the enamel, and into the enamel while soft and fresh laid on. Then I jar or strike the board or substance on which the enamel has been placed. Then by the slight concussion aforesaid I blend the colors into the ground color on the surfaces so enameled, giving it a very beautiful appearance. I then apply the coatings of varnish, as aforesaid, after the paint or enamel has become dry.

I claim the use of a gum-resin or linseed-oil varnish on this composition of matter in the form of either the paint, enamel, or cement, and find that it is also practical and useful and deports itself well; but I do not claim the use of an oil or resin varnish for any purpose other than its use and application in my composition of matter, or upon the surfaces of the same as a varnish.

To enable others skilled in the art to make my composition of matter and to use my invention, I will proceed to describe its preparation and manufacture.

I take about equal quantities, by weight, of fine white marble and an alkaline silicate, the silicates being about 25° to 30° Baumé, and mix them well together until the same is about the consistency of a thick cream; then grind them together. The ingredients may be heated when mixed; but I prefer to use them without heat. I use sometimes a less weight of the silicate to the marble employed. If it is to be used as a plaster or cement, I use about two parts of marble to one part of the silicate; if for an enamel, I use about equal parts. For a paint I use about two parts, by weight, of the silicates to one part of marble, the silicates being of specific gravity about 20°. I use in the paint about equal parts of carbonate of lime—as, for instance paris-white or whiting—that is to say, equal parts of dry fine white marble and carbonate of lime with about twice its weight of the silicate aforesaid at 20°. I use in the composition for the paint about one part of white oxide of zinc to every four parts of the marble used, and I use about one part of china-clay or white clay to every ten or twelve parts of marble used. All these substances I grind in a mill before using, except it is for a coarse paint.

I can and do use in the above composition of matter which forms my enamel, cement, plaster, and paint, and which I have described, some of the following earthy and metallic colors for the purpose of giving color to my composition of matter: terra-sienna, red and yellow ocher, Indian red, vermilion, ultramarine, oxides of iron and alumina, red chalk, chromes, ivory and lamp black, &c.

The alkaline silicates which I use for the purpose of a gloss or varnish over the surfaces of the paint, enamel, and plaster I prepare as follows: I use the same silicious silicate that I form my composition for paints—a silicate of soda I prefer to use. I add from five to ten per cent. of marble in powder to the silicate, which silicate should be from 18° to 20° Baumé, and then heat it until a thick scum arises on the surface. Then I let it settle, and when it becomes clear I use it as a varnish over the white colors. I use it to saturation and to the extent of producing a fine gloss. For the purpose of varnishing over colors I use the same silicates, prepared in the same manner, with from two to three per cent. of the white oxide of zinc, instead of the carbonate of lime or the marble, as aforesaid.

In the event of the enamel or the paints becoming too thick for use, I use more alkaline silicates (prepared as heretofore named) to thin the paints and enamel; and if I find the paints too thin I use more of the dry materials in their composition. For a very thin paint I use three parts of silicate, by weight, to one part of the dry materials, by weight.

The formation of my composition of matter (whether as a paint or enamel by the use of the described substances and the relative proportions herein set forth) is such that after the first application of one single coating to any substance, and after it becomes dry on such surface, it resists water and is insoluble, and is also blaze-proof to fire.

In the enameling of surfaces I use any and all of the different colors previously mixed up with the white enamel as a base, as follows: I place the color in drops or in larger bodies on the marble-enamel while the same is soft and before it becomes dry, then spread or diffuse the colors into the ground-work by concussion, giving it the appearance of native or natural marble.

I can use on my composition of matter after it becomes dry on surfaces, either in the form of enamel or paints, any of the well-known resinous or oil varnishes instead of a silicate varnish, if preferred, with a good result.

In the use of my enamel-paint for the purposes of covering iron, steel, or other solid metallic substances, or for the production of an artificial marble or stone for crockery, buttons, ornaments, porcelain, enameling iron vessels, kettles, or hollow ware, and for various other similar uses, I apply a heat to the articles so covered or coated or fabricated not to exceed 300° Fahrenheit, or about the degree of heat that will slightly char wood. I submit the article to this heat after its coatings are dry, and this I do before I apply the gloss or silicate varnish on the enamel or paint; but when the articles so coated require a low degree of heat—say from 100° to 150°—the silicate varnish can in this case be applied to the enamel before heating.

In the preparation of my composition for purposes of a cement to apply to stone, brick, or for the production of artificial stone, or for coating roughly on surfaces of any kind, I use sand, pebbles, gravel, or similar hard earthy substances into the cement in different proportions, for the purposes of utility and economy, and then afterward apply the silicate varnish to the same and on the surfaces of the same to give it a hard, vitreous finish.

For the purposes of applying my enamel to paper or cloth—as the cover of books, paper boxes, oil-cloth—various kinds of ornaments composed of wood, paper, glass, cloth, &c., or to household furniture, I dry the enamel after its application very slowly, and after it is thoroughly dry I find that the application of a resinous varnish—as copal, shellac, dammar, &c.—produces a very good effect, particularly on substances liable to warp or shrink, also giving the enamel more elasticity.

I do not claim as my invention a silicated paint or an alkaline silicate as a vehicle for applying colors as a paint to substances, for I am aware that this substance has long been used for such purposes.

I am also aware that zinc, lime, and clay, oil varnishes, and resinous varnishes are all well-known articles in use for painting, varnishing, and for whitewashing; neither do I claim, separately or individually considered, their use.

I am also aware that alkaline silicates have long been used for the formation of plaster and cement, and therefore I disclaim separately its use.

What I claim as my invention, and desire to secure by Letters Patent, is—

1. A composition of matter formed and prepared from ground or pulverized marble or natural limestone and an alkaline silicate as a base, substantially as set forth, for purposes of an enamel, cement, and plaster.

2. The use of a carbonate of lime, white oxide of zinc, and silicate of alumina into the base of the composition of matter, for the purposes of a paint, enamel, and cement, substantially as set forth.

3. The mode or process for the preparation of alkaline silicates preparatory to its use in my composition of matter, and for its uses as a varnish in the application of the paint, enamel, and plaster, substantially as described.

4. The use and application of the different colors and shades of color by the mode or process of blending, by concussion or otherwise, into my composition of matter while the same is soft or fluid and before the same becomes hard, substantially as set forth.

5. The mode and the application of certain temperatures of heat to the articles fabricated from my composition of matter, and to metallic or earthy substances coated and enameled therewith, substantially as set forth.

6. The use of an oil or an oil and resinous varnish over the composition of matter, after the same has become dry, in one or more coatings, substantially as set forth.

7. The use and application of sand and pebbles into my composition of matter for the purposes of a cement, &c., substantially as set forth.

Dated January 7, 1865.

MORGAN W. BROWN.

Witnesses:
   THOS. GEO. HARVED,
   CHAS. H. SMITH.